United States Patent
Myrah et al.

(10) Patent No.: US 8,972,618 B2
(45) Date of Patent: Mar. 3, 2015

(54) STAGED DISCOVERY IN A DATA STORAGE FABRIC

(75) Inventors: Michael G Myrah, Cypress, TX (US); Balaji Natrajan, Spring, TX (US); Chaowen Tan, Houston, TX (US)

(73) Assignee: Hewlett-Packard Develpment Company, L.P., Houston, TX (US)

( * ) Notice: Subject to any disclaimer, the term of this patent is extended or adjusted under 35 U.S.C. 154(b) by 59 days.

(21) Appl. No.: 13/563,166

(22) Filed: Jul. 31, 2012

(65) Prior Publication Data

US 2014/0040510 A1    Feb. 6, 2014

(51) Int. Cl.
    *G06F 3/00* (2006.01)
(52) U.S. Cl.
    USPC .......................................................... 710/11
(58) Field of Classification Search
    None
    See application file for complete search history.

(56) References Cited

U.S. PATENT DOCUMENTS

| | | | |
|---|---|---|---|
| 7,401,171 B2 | 7/2008 | Slutz et al. | |
| 7,673,185 B2 | 3/2010 | Kalwitz et al. | |
| 7,822,900 B2 * | 10/2010 | Kaushik et al. | 710/302 |
| 8,051,436 B2 | 11/2011 | Jones | |
| 2002/0075870 A1 * | 6/2002 | de Azevedo et al. | 370/390 |
| 2007/0130168 A1 * | 6/2007 | Watanabe et al. | 707/10 |
| 2009/0007154 A1 * | 1/2009 | Jones | 719/326 |
| 2009/0125655 A1 * | 5/2009 | Jones et al. | 710/104 |
| 2009/0150643 A1 * | 6/2009 | Jones et al. | 711/203 |
| 2011/0125943 A1 * | 5/2011 | Oikawa et al. | 710/106 |
| 2012/0124256 A1 | 5/2012 | Johnson et al. | |
| 2013/0283264 A1 * | 10/2013 | Bhattacharya et al. | 718/1 |

OTHER PUBLICATIONS

Symons, Tim, "Evolution of SAS," PMC-Sierra, Inc., White Paper, Issue No. 1, pp. 1-20 (Apr. 2007).
Liao, Heng et al., "Managing Access Control Through SAS Zoning," PMC-Sierra, White Paper, pp. 2 (Nov. 20, 2006).

* cited by examiner

*Primary Examiner* — Elias Mamo
(74) *Attorney, Agent, or Firm* — Dicke, Billig & Czaja, PLLC

(57) ABSTRACT

A method of performing discovery in a data storage fabric is disclosed. Performing discovery includes performing a first stage of discovery on expanders in the data storage fabric prior to broadcasting a discovery command to initiators on the data storage fabric. After the first stage has completed, providing the discovery command to the initiators to perform a second stage of discovery.

21 Claims, 4 Drawing Sheets

STAGED DISCOVERY IN A DATA STORAGE FABRIC

BACKGROUND

In data storage technology, Small Computer System Interface, or SCSI, is a set of standards for physically connecting and transferring data between computers and peripheral devices. The SCSI standards define commands, protocols, and electrical and optical interfaces. SCSI is often used for hard disks and tape drives, but it can connect a wide range of other devices, including scanners and optical disc drives. The SCSI standard defines command sets for specific peripheral device types; the presence of "unknown" as one of these types means it can be used as an interface to almost any device, but the standard is (pragmatic) and addressed toward commercial applications such as Redundant Array of Independent Disks, or RAID.

Since the public introduction of SCSI in 1981, there have been seven generations of the parallel SCSI protocol. Each generation essentially doubled the bandwidth of the previous one, primarily by doubling the bus clock frequency. But as the bus frequency was increased with each new generation, so did the negative impact of bus contention, signal degradation, and signal skew, i.e., slight signal delays from one wire trace to the next. After the development of Ultra320 SCSI standard with a bandwidth of 320 MB/s per channel, further bandwidth improvements to parallel SCSI may be difficult without developing new and expensive technologies.

Serial Attached SCSI, commonly referred to as SAS, is a relatively recently-developed computer bus used to move data to and from computer storage devices. SAS was later transferred to the InterNational Committee for Information Technology Standards (INCITS) T10 to become an American National Standards Institute, or ANSI, and International Organization for Standardization/International Electrotechnical Commission, or ISO/IEC, standard. SAS uses a point-to-point serial protocol that replaces the parallel SCSI bus technology in data centers and workstations. SAS applies the command set from parallel SCSI, frame formats and full duplex communication of Fibre Channel. Also, SAS uses the Serial Advanced Technology Attachment, often abbreviated Serial ATA or simply SATA, interface for compatibility and investment protection. The SAS architecture addresses the parallel SCSI problems of bus contention, clock skew, and signal degradation at higher signaling rates, and can provide performance headroom in enterprise storage applications over SCSI.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
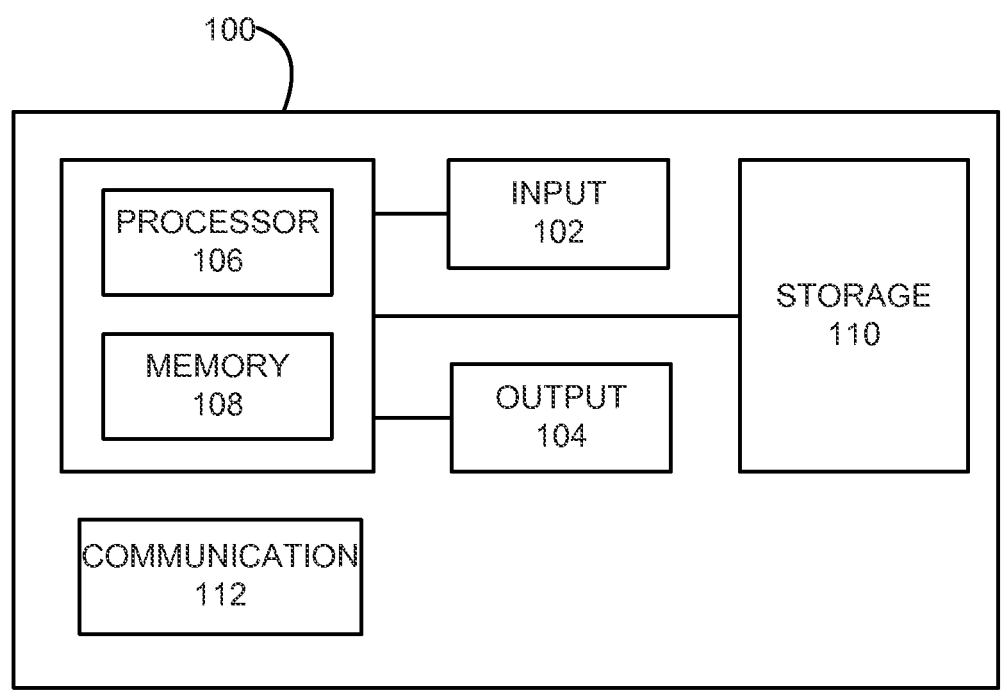
FIG. 1 is a block diagram illustrating an example of a computing device.

FIG. 1 illustrates an embodiment of a computer system and includes a computing device 100 that is employed in a SAS domain and used to perform the features of the two-staged discovery. The computing device 100 can include a server, mobile device, gaming system, computer peripheral, interchangeable disk drive, or other device, and is not intended to be limited to a particular class of devices known as computers. In one example, the computing device 100 can include or can be coupled to one or more input devices 102, such as keyboard, pointing device (e.g., mouse), voice input device, touch input device, or other input connection. Computing device 100 can also include or can be coupled one or more output devices 104, such as a display, printer, or other output connection. In a basic configuration, computing device 100 typically includes a processor architecture having at least one processing unit, i.e., processor 106, and memory 108. Depending on the configuration and type of computing device, memory 106 may be volatile, non-volatile, or some combination of the two. The memory 108 can be arranged in a memory hierarchy such as a cache. Computing device 100 can also include additional storage 110 including, but not limited to, magnetic or optical disks or solid state memory, or flash storage devices for storage of information such as computer readable instructions, data structures, program modules or other data. The computing device 100 can be configured to run computer readable instructions such as firmware from a tangible storage media and an operating system software program that can be stored on the storage media or memory as well as one or more software applications including firmware, which make up a system platform.

Memory 108 and storage 110 are examples of computer storage media that can be used to store the desired information and that can be accessed by computing device 100 or by other devices. Computer storage media can be part of computing device 100. Computing device 100 can also include one or more communication connections 112 that allow the computing device 100 to communicate with other devices on a network such as the Internet or a data storage fabric.

Figure 2:
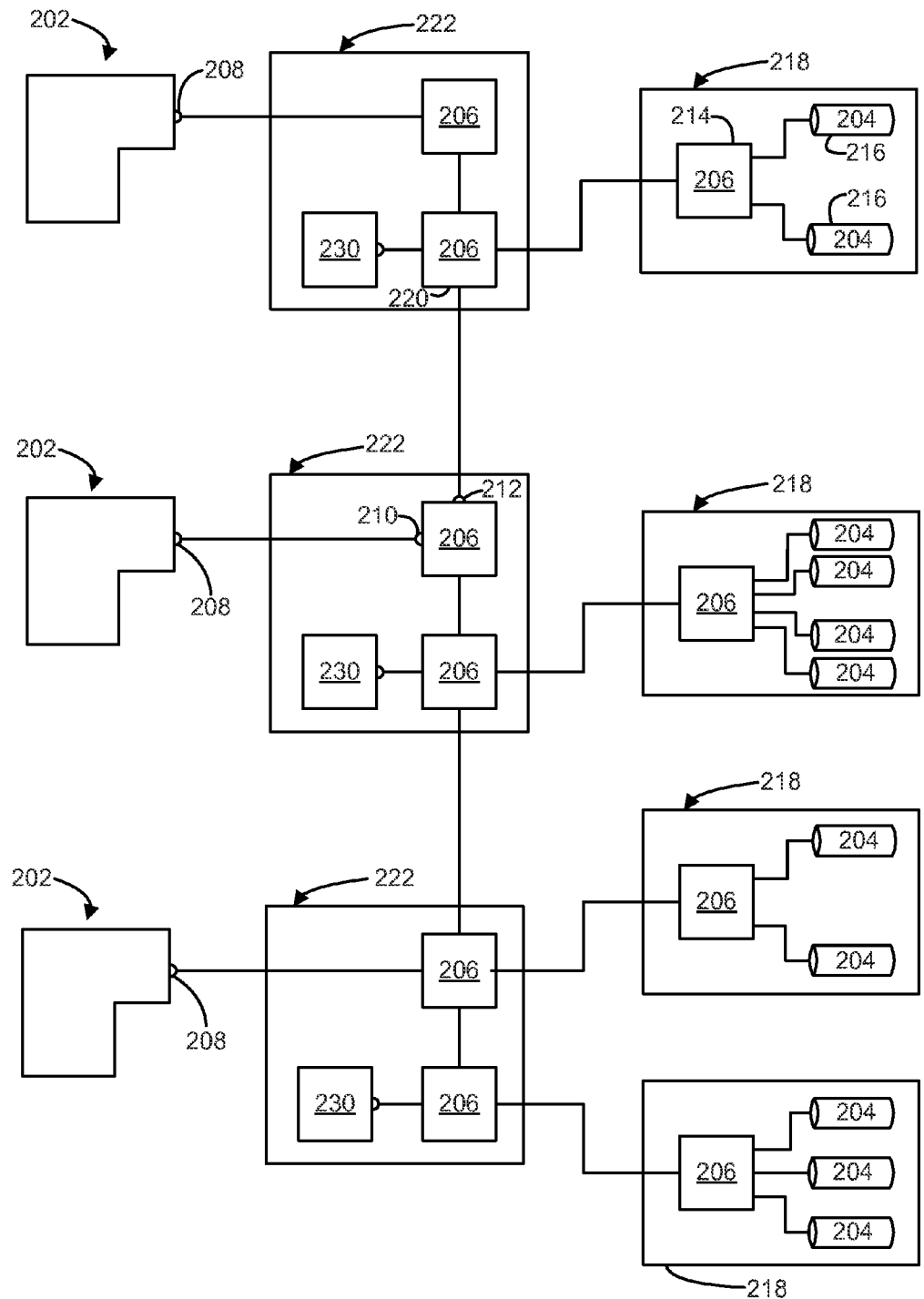
FIG. 2 is a schematic diagram illustrating an example of an SAS fabric that can be configured to employ computing devices such as the computing device of FIG. 1.

FIG. 2 illustrates an example SAS fabric, or SAS domain 200. SAS is a point-to-point architecture that transfers data to and from SCSI storage devices by using serial communication. In general, an SAS domain is an input/output (I/O) system having of a set of SAS devices that communicate with one another by means of a service delivery subsystem. SAS devices the SAS domain 200 use to achieve reliable, high-speed serial communication in general include initiators 202, targets 204, and expanders 206, which can be considered a type of computing device 100. Each SAS device has a unique worldwide name, or SAS address, which identifies of an initiator port, a target port, or an expander device, assigned at manufacturing to simplify its identification in a domain.

The initiator 202 is a host bus adaptor (HBA), or controller that at times may be a stand-alone device or can be included as a component in the computing device 100. The initiator 202 is attached to one or more targets 204, such as SAS hard disk drives, SATA hard disk drives, and SAS tape drives, to form an SAS domain. An initiator 202 often includes one or more of Serial SCSI Protocol (SSP) ports typically used to communicate with SAS drives, Serial ATA Tunneling Protocol (STP) ports typically used to communicate with SATA drives, and/or Serial Management Protocol (SMP) ports typically used to communicate with expanders 206 in an SAS domain.

An SAS initiator 202 typically includes multiple ports 208 for connection to internal targets, external targets, such as targets 204, or both. An internal target can include, for example, a RAID system including SAS or SATA drives included within the computing device 100, which can include a server. Each initiator port can have a single physical link, which can be referred to as a narrow port, or 2, 4, 8 or more physical links, which can be referred to as a wide port and are described below. SAS initiator ports can be connected to separate domains for fail-over redundancy. SAS hard drives (such as enterprise-class and midline devices) can have two narrow ports. Each port can reside in a different SAS domain to provide fail-over redundancy and load balancing. SAS hard drives leverage a common electrical and Physical connection interface with SATA hard drives. However, SATA hard drives, including solid-state drives, can have a single narrow port.

A PHY is an object in a device that is used to interface to other devices. A physical PHY is a PHY that includes a transceiver and electrically interfaces to a physical link to communicate with another physical PHY. A virtual PHY is a PHY that interfaces with a vendor-specific interface to another virtual PHY inside the same device. A PHY is a mechanism that contains a transceiver that electrically interfaces to a physical link. In one example, a physical link includes two differential signal pairs, one pair in each direction, to connect together two physical PHYs. A wide port includes more than one PHY, and a wide link is a group of physical links that attaches a wide port to another wide port. In the example fabric 200, PHYs are included in the disk drive bays, rather than the drives themselves, as the drives can be easily interchanged.

Expanders 206 are high-speed switches that scale the number of targets 204 attached to an initiator 202, thereby creating a larger SAS domain 200. Expanders 206 establish connections between initiators 202, targets 204, and other expanders 206 by receiving commands and data in one port, such as a port 210 proximal to the initiator 202, and routing them to another port, such as port 212 distal to the initiator 202, based on the SAS address of the target 204. In some examples, an expander 214 includes a port distal to the initiator 202 directly coupled to a target 216, such as within a storage enclosure 218 and can be referred to here as an enclosure expander 214. The storage enclosure 218 can include multiple targets 216 and a storage enclosure processing system 220 in addition to the enclosure expander 214. In other examples, an expander 222 includes a port distal to the initiator 202 directly coupled to another expander 206 and can be referred to here as a switch expander 222. In the illustrated example, the initiator 202 is coupled to switch expander 222 that is coupled to an enclosure expander 214 that is coupled to the targets 216.

Expanders 206 use three routing methods—direct, table, and subtractive. An expander, such as enclosure expander 214, uses direct routing to forward commands and data to targets 216 directly attached to the enclosure expander 214. An expander, such as switch expander 222, uses table routing to forward commands and data to another expander, such as enclosure expander 214 or to another switch expander (not shown). Table routing is used for identifying devices connected to the expanders connected to a device's own PHY. When an expander 206 receives an address that it does not recognize, it uses subtractive routing to forward the commands and data to another expander 206 that does recognize the address.

Many storage networks can be implemented with just a set of typical SAS switch expander 222 (such as 16 ports as currently used), but there are some larger customers that would prefer to have double or triple the amounts of ports as typical switch expander 222. To meet the demands of large storage networks, two or more typical switch expanders 222 can be trunked together, or formed as a daisy chain, to enlarge the SAS fabric 200. In one example, a switch expander 222 proximate to an initiator 202 can have a port distal to the initiator 202 coupled to another switch expander at a port proximal to the initiator 202. Trunking can continue in this manner until the SAS fabric 200 is configured to meet the demands of the user. SAS fabrics 200 can be initially configure with trunked switch expanders 222, switch expanders 222 can be later trunked to incrementally scale the network, or a combination of the two.

The number of SAS devices in a given domain 200 is limited only by the size of the expander routing tables, but managing a large number of devices can be complicated. Zoning is a management tool included in the SAS standard, such as SAS-2 and above, to provide for traffic management and security. Second-generation SAS (SAS-2) link speed doubles the physical link rate to 6.0 Gb/s. SAS-2 eliminates the distinction between fanout and edge expanders with self-configuring expanders. SAS-2 is backward compatible with SAS-1. SAS-2 also enables zoning for enhanced resource deployment flexibility, security, and data traffic management.

Through the use of zoning, large physical topologies can be broken into logical groups such as zone groups, which are a set of PHYs in a zone that all have the same access permission. A group of zoning-enabled expanders that cooperate to control access between PHYs is known as a zoned portion of a service delivery system (ZPSDS). Examples of zoning include 128 or 256 zone groups numbered from 0 to 127 or 0 to 255, respectively. Zone groups 0 through 8 are pre-defined in the SAS standard. Devices in zone group 0 can only access devices in zone group 1, while devices in zone group 1 are allowed access to all zone groups. For example, a system administrator can use zone group 0 for a new (unassigned) device that is added to a ZPSDS. The administrator can also use zone group 1 for topology discovery and zone management. In one example, one ZPSDS is created per fabric 200.

Permission tables in SAS expanders 206 control zoning. An end device does not require any special features to operate within a zoned SAS domain, which makes legacy SAS and SATA devices compatible. An end device in a zone can interface with other end devices in the domain as permitted by the zoning expander. The SAS-2 standard permits zoning, a secure zoning method that uses the unique identifier (ID) number of each expander PHY. In zoning, each port of a zoning expander is assigned to a zone group, and any device attached to one of the ports becomes part of that respective zone group. Devices within a zone group can interact with each other. The permission table in the expander controls access between devices in different zone groups. If an attached device changes, the expander may be configured to set the zone group to 0, or no access, which allows an address-resolved-like policy to be implemented. For example, if a particular SAS device address includes certain permissions and the device is moved to a different expander in the fabric, then the zone manager can reprogram the zone group at the new location.

A zone manager 230 is responsible for configuring each zone. The zone manager 230 can control a zone by using an end device that has an SAS port connected to one of the zoning expanders. The zone manager 230 can also control a zone through a sideband interface (such as Ethernet) on one or more zoning expanders. The zone manager 230 assigns zone groups to all zoning expander PHYs, and it assigns all PHYs in a wide port to the same zone group. The zone manager 230 stores the zoning assignment of each zoning expander PHY along with SAS addresses in the zoning expander's route table. Inside a particular ZPSDS, the zone manager assigns each zoning expander PHY attached to another zoning expander PHY to zone group 1. PHYs in zone group 1 have access to PHYs in all zone groups. The zone manager 230 assigns each zoning expander PHY on the boundary of the ZPSDS to a zone group other than group 1. The ZPSDS boundary is defined by designating expander PHYs as "not trusted" when connected to end devices outside the zone. Each zoning expander device also contains a zone permission table that controls whether a connection is allowed between PHYs in different zone groups.

In the SAS specification, expanders 206 can originate primitives when certain events occur. Characters transferred in SAS are grouped into four-character sequences call dwords. A primitive in this disclosure is a dword with a first character such as K28.5 and with the remaining three characters are data characters with correct disparity, but primitives with other first characters are known. A change in the configuration of the fabric 200 will cause an expander 206 to originate a BROADCAST primitive, or BROADCAST (CHANGE). The SAS standard provides that expanders 206 will rebroadcast the primitive out of all PHYs that did not originate the BROADCAST primitive. The BROADCAST primitive causes initiator ports and expander ports to run, or re-run, standard discovery to search for the initiators 202, targets 204, and expanders 206 on the fabric 200.

When the BROADCAST primitive is detected, the initiators 202 begin their respective discovery routines. In this standard discovery, the discovery routines are often run concurrently with each other and in a nondeterministic order. In certain cases, the expanders 206 will present a particular view of the fabric 200 that is virtualized or optimized for particular upstream initiator devices such as array controllers. The lack of order in the discovery routines of standard discovery currently used, particularly when the fabric 200 includes proprietary features such as proprietary topology virtualization features, can lead to inefficiencies and errors in the discovery process.

Figure 3:
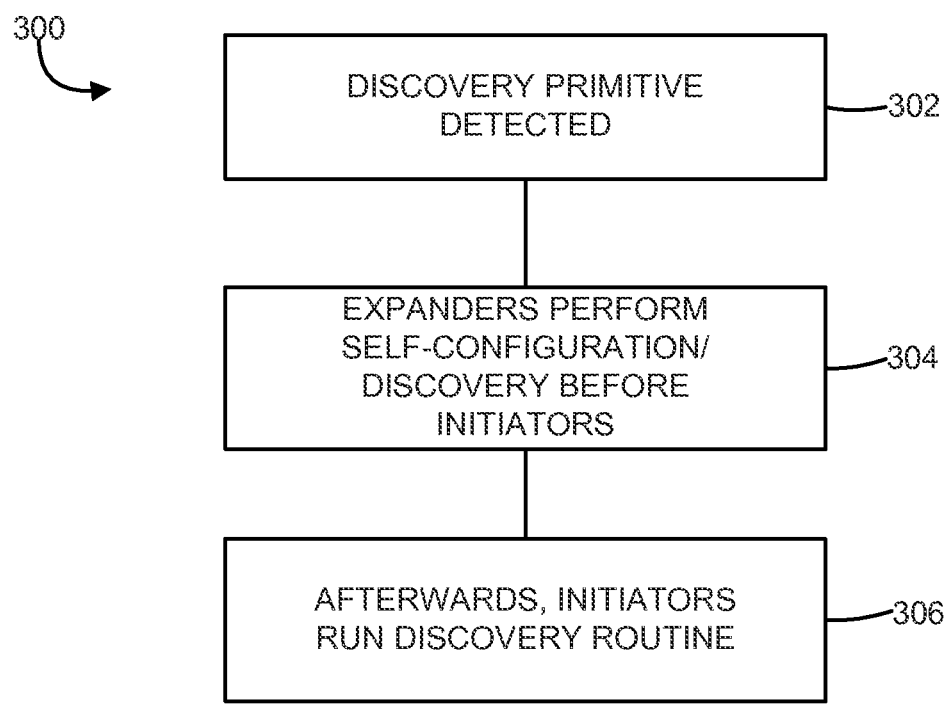
FIG. 3 is a block diagram illustrating an example of a method for performing a staged discovery in the SAS fabric of FIG. 2.

FIG. 3 illustrates a method 300 for use with the fabric 200 that creates a staged approach to fabric discovery to reduce errors and inefficiencies created with standard discovery. Discovery commands such as the BROADCAST primitive can be initiated when there is a reconfiguration of the fabric, such as when a drive, such as a disk drive or other, is added or removed. Accordingly, after a discovery command, such as a BROADCAST primitive or other primitive or command that initiates a discovery process is detected at 302, the expanders 206 are provided time to run discovery or to discover the fabric 200 and to enable proprietary features before the initiators 202 perform discovery at 304. Subsequently, the initiators 202 run discovery at 306. Method 300 reduces the chance for errors if the initiators 202 are performing standard discovery while the proprietary features are being initialized in the fabric 200 with the current methodology. Even if no errors occur, the initiators 202 may have to perform standard discovery again if the original process was run while the expanders 206 were enabling the proprietary features in the current methodology.

Figure 4:
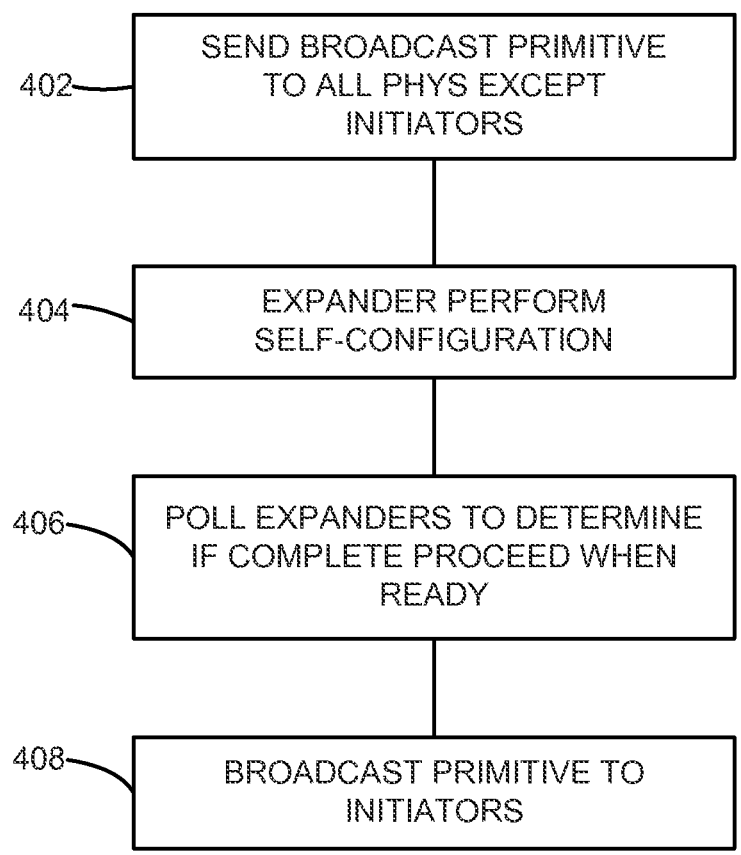
FIG. 4 is a block diagram illustrating an example method to implement the method of FIG. 3.

FIG. 4 illustrates a method 400 to implement the staged discovery of method 300. The expander 206 originating the change in configuration will send out the BROADCAST primitive to all PHYs except for the initiators 202 including initiator end devices such as array controllers, at 402. The expanders receiving the BROADCAST primitive will perform a self-configuration at 404. In connection with performing self-configuration, each of the expanders receiving the broadcast primitive will include an indicator while it is in the process of self-configuration and will remove the indicator after self-configuration is completed. For example, the expanders 206 will set a SELF CONFIGURING bit while in the process of discovery. During self-configuration at 404, the expanders will perform SMP discovery and set up the proprietary or virtualization features if applicable. After a designated expander has finished self-configuration, it will begin to poll the other expanders in the fabric to determine whether the other expanders have also completed self-configuration at 406. In one example, the designated expander is the expander originating the change in configuration. One example of polling the other expanders includes checking to see if the SELF CONFIGURING bit is still set using an SMP REPORT GENERAL command. After all of the expanders 206 have finished self-configuration, an expander will rebroadcast the BROADCAST primitive to the initiators 202, at 408. The initiators 202 will then begin the process of standard discovery.

A process of staged discovery simplifies SAS domain virtualization having SAS compliant initiators while still implementing new proprietary features in the fabric, new features for optimized routing, or new features in general where expanders should become aware of features prior to initiators.

Although specific embodiments have been illustrated and described herein, it will be appreciated that a variety of alternate and/or equivalent implementations may be substituted for the specific embodiments shown and described without departing from the scope of the present application. This application is intended to cover any adaptations or variations of the specific embodiments discussed herein.

What is claimed is:

1. A system of performing discovery in a data storage fabric, the system comprising:
    an expander of a plurality of expanders to:
        send a discovery command to PHYs in the data storage fabric except for an initiator,
        perform a first stage of discovery wherein the plurality of expanders perform self-configuration, and wherein self-configuration in an expander in the plurality of expanders includes setting at least one of proprietary features and virtualization features of the expander in the plurality of expanders in response to the discovery command, and
        broadcast the discovery command to the initiator to perform a second stage of discovery after the plurality of expanders are detected to have completed performing the self-configuration.

2. The system of claim 1 wherein the data storage fabric is a second-generation Serial Attached Small Computer System Interface (SAS-2) domain.

3. The system of claim 1 wherein the discovery command is a primitive.

4. The system of claim 3 wherein the primitive is a BROADCAST primitive.

5. The system of claim 4 wherein the BROADCAST primitive is BROADCAST(CHANGE).

6. The system of claim 1 wherein the discovery command is issued when the data storage fabric is reconfigured.

7. The system of claim 6 wherein the data storage fabric is reconfigured when a disk drive is added.

8. The system of claim 1 wherein a discovery process is initiated when a PHY detects the discovery command.

9. The system of claim 1 wherein the expanders do not broadcast the discovery command to the initiators until after the first stage of discovery has completed.

10. The system of claim 1 wherein performing the first stage discovery includes enabling proprietary features in the expanders.

11. The system of claim 10 wherein performing the first stage of discovery further includes generating domain virtualization features.

12. A method of performing discovery in a data storage fabric including a plurality of expanders and an initiator, the method comprising:
sending a discovery command to PHYs in the data storage fabric except for the initiator;
performing a first stage of discovery wherein the plurality of expanders perform self-configuration, and wherein self-configuration in an expander in the plurality of expanders includes setting at least one of proprietary features and virtualization features of the expander in the plurality of expanders in response to the discovery command; and
broadcasting the discovery command to the initiator to perform a second stage of discovery after the plurality of expanders are detected to have completed performing the self-configuration.

13. The method of claim 12 wherein an expander in the plurality of expanders that originates a change of configuration broadcasts the discovery command.

14. The method of claim 13 wherein the change of condition includes addition of a drive.

15. A method of performing discovery in a data storage fabric including a plurality of expanders and an initiator, the method comprising:
sending a discovery command to PHYs in the data storage fabric except for the initiator;
performing a first stage of discovery wherein the plurality of expanders perform self-configuration, and wherein self-configuration in an expander in the plurality of expanders includes setting at least one of proprietary features and virtualization features of the expander in the plurality of expanders;
wherein a designated expander of the plurality of expanders polls the other expanders of the plurality of expanders to detect whether the plurality of expanders have completed performing the self-configuration; and
broadcasting the discovery command to the initiator to perform a second stage of discovery after the plurality of expanders are detected to have completed performing the self-configuration.

16. The method of claim 15 wherein the designated expander of the plurality of expanders completes performing self-configuration prior to polling the other expanders of the plurality of expanders.

17. The method of claim 15 wherein the designated expander of the plurality of expanders is an expander in the plurality of expanders that originates a change of configuration.

18. The method of claim 12 wherein the proprietary feature includes proprietary topology virtualization.

19. A method of performing discovery in a data storage fabric including a plurality of expanders and an initiator, the method comprising:
sending a BROADCAST primitive in response to a change in fabric configuration to PHYs in the data storage fabric except for the initiator;
performing a first stage of discovery wherein the plurality of expanders perform self-configuration, and wherein self-configuration in an expander in the plurality of expanders includes setting proprietary and virtualization features of the expander in the plurality of expanders;
polling expanders in the plurality of expanders to detect whether each of the polled expanders in the plurality of expanders has completed self-configuration wherein each of the polled expanders includes an indicator while performing self-configuration and removes the indicator when self-configuration is completed; and
broadcasting the BROADCAST primitive to the initiator to perform a second stage of discovery including a Serial Management Protocol (SMP) discovery after the plurality of expanders are detected to have completed performing the self-configuration.

20. The method of claim 19 wherein the indicator is a SELF CONFIGURATION bit and the polling is performed with an SMP REPORT GENERAL command.

21. The method of claim 12 wherein the sending a discovery command to PHYs in the data storage fabric except for the initiator is introduced from an expander in the plurality of expanders.

* * * * *

UNITED STATES PATENT AND TRADEMARK OFFICE
CERTIFICATE OF CORRECTION

| | |
|---|---|
| PATENT NO. | : 8,972,618 B2 |
| APPLICATION NO. | : 13/563166 |
| DATED | : March 3, 2015 |
| INVENTOR(S) | : Michael G. Myrah et al. |

Page 1 of 1

It is certified that error appears in the above-identified patent and that said Letters Patent is hereby corrected as shown below:

On the title page, item (73), Assignee, in column 1, line 1, delete "Develpment" and insert -- Development --, therefor.

Signed and Sealed this
Tenth Day of November, 2015

Michelle K. Lee
*Director of the United States Patent and Trademark Office*